US012736853B2

(12) United States Patent
Ito

(10) Patent No.: US 12,736,853 B2
(45) Date of Patent: Sep. 15, 2026

(54) LENS APPARATUS AND IMAGE PICKUP APPARATUS

(71) Applicant: CANON KABUSHIKI KAISHA, Tokyo (JP)

(72) Inventor: Shu Ito, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 299 days.

(21) Appl. No.: 18/544,792

(22) Filed: Dec. 19, 2023

(65) Prior Publication Data

US 2024/0248371 A1 Jul. 25, 2024

(30) Foreign Application Priority Data

Jan. 23, 2023 (JP) ................................ 2023-007905

(51) Int. Cl.
*G03B 5/04* (2021.01)
*G02B 7/04* (2021.01)
*G03B 13/34* (2021.01)

(52) U.S. Cl.
CPC ................ *G03B 5/04* (2013.01); *G02B 7/04* (2013.01); *G03B 13/34* (2013.01)

(58) Field of Classification Search
CPC ............ G03B 5/04; G03B 13/34; G02B 7/04
See application file for complete search history.

(56) References Cited

U.S. PATENT DOCUMENTS 9,204,049 B2 12/2015 Nomura et al.
2006/0093339 A1* 5/2006 Umezu .................. G03B 17/02 396/55
2025/0020977 A1* 1/2025 Lee ........................ H04N 23/00

FOREIGN PATENT DOCUMENTS

JP 2013238848 A 11/2013
JP 2014164062 A 9/2014
WO 2012107965 A1 8/2012

* cited by examiner

*Primary Examiner* — Nathanael R Briggs
(74) *Attorney, Agent, or Firm* — ROSSI, KIMMS & McDOWELL LLP

(57) ABSTRACT

A lens apparatus includes an optical system including a first optical member included in a first lens unit disposed closest to an object and movable in a direction including a component orthogonal to an optical axis during image stabilization, and a second optical member different from the first optical member, a first driving unit configured to move the first optical member, and a second driving unit configured to move the second optical member. The first driving unit and the second driving unit are disposed so as not to overlap each other when viewed along the optical axis of the optical system. A position, of at least part of the second driving unit, in a direction along the optical axis overlaps a position of the first lens unit, in the direction along the optical axis.

15 Claims, 7 Drawing Sheets

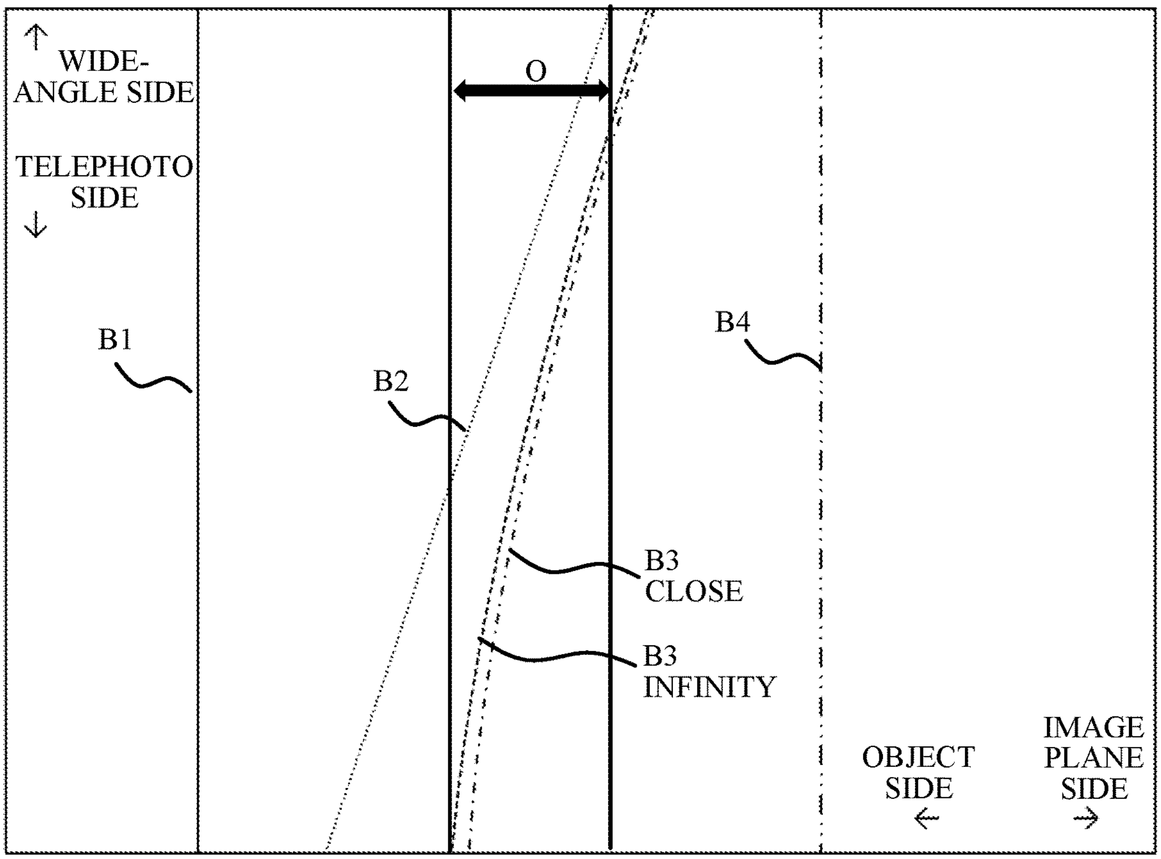
FIG. 4
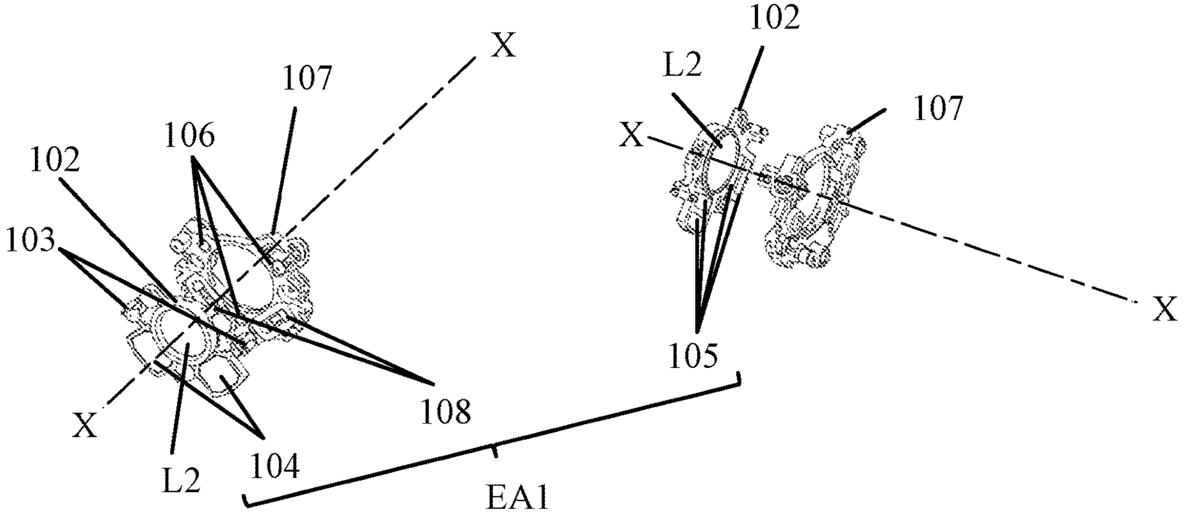
FIG. 5A
FIG. 5B

LENS APPARATUS AND IMAGE PICKUP APPARATUS

BACKGROUND

Technical Field

One of the aspects of the embodiments relates to a lens apparatus having an image stabilizing apparatus.

Description of Related Art

In the conventional configuration for miniaturization, a lens unit disposed closest to an object of an optical system serves as an image stabilizing unit for correcting image blur caused by camera shake, etc. (Japanese Patent Laid-Open No. 2013-238848).

The image stabilizing unit often uses a voice coil motor (VCM) to move a correction lens (image stabilizing lens), but the VCM may generate magnetic noise that causes image quality deterioration of an image signal. The optical system often uses a stepping motor to move lenses for zooming and focusing, but the stepping motor may also generate magnetic noise. Both the VCM and the stepping motor are actuators that utilize electromagnetic force, and if they are close to each other, they may interact electromagnetically with each other and cause malfunctions.

Japanese Patent Laid-Open No. 2013-238848 is silent about the suppression of image quality deterioration or electromagnetic interference in driving the electromagnetic actuators.

SUMMARY

A lens apparatus according to one aspect of the embodiment includes an optical system including a first optical member included in a first lens unit disposed closest to an object and movable in a direction including a component orthogonal to an optical axis during image stabilization, and a second optical member different from the first optical member, a first driving unit configured to move the first optical member, and a second driving unit configured to move the second optical member. The first driving unit and the second driving unit are disposed so as not to overlap each other when viewed along the optical axis of the optical system. A position, of at least part of the second driving unit, in a direction along the optical axis overlaps a position, of the first lens unit, in the direction along the optical axis. An image pickup apparatus having the above lens apparatus also constitutes another aspect of the embodiment.

Further features of the disclosure will become apparent from the following description of embodiments with reference to the attached drawings.

BRIEF DESCRIPTION OF THE DRAWINGS

FIG. 4 illustrates a moving locus of each lens unit for zooming.

FIGS. 5A and 5B are exploded perspective views of an image stabilizing apparatus.

DESCRIPTION OF THE EMBODIMENTS

Figure 1:
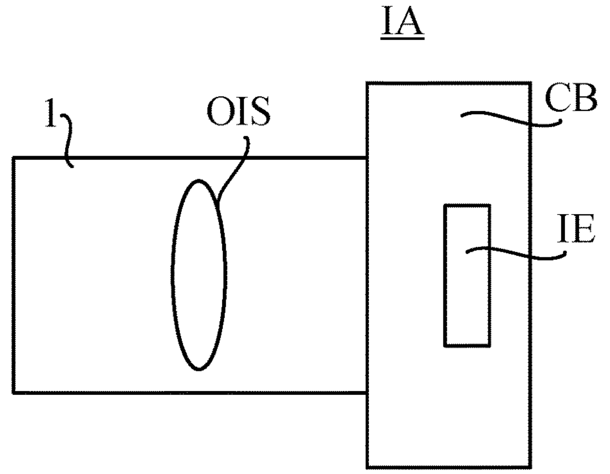
FIG. 1 is a schematic diagram of an image pickup apparatus according to one embodiment.

Referring now to the accompanying drawings, a detailed description will be given of embodiments according to the disclosure. Corresponding elements in respective figures will be designated by the same reference numerals, and a duplicate description thereof will be omitted.

FIG. 1 is a schematic diagram of an image pickup apparatus IA according to this embodiment. The image pickup apparatus IA includes an interchangeable lens (lens apparatus) 1 and a camera body CB. The interchangeable lens 1 holds an optical system OIS. The camera body CB holds an image sensor IE. The image sensor IE is a photoelectric conversion element such as a CMOS or CCD that converts light from an object that has passed through the interchangeable lens 1 into an electrical signal. The interchangeable lens 1 may be integrated with the camera body CB, or may be attachable to and detachable from the camera body CB. The interchangeable lens 1 may hold an image sensor IE.

Figure 2:
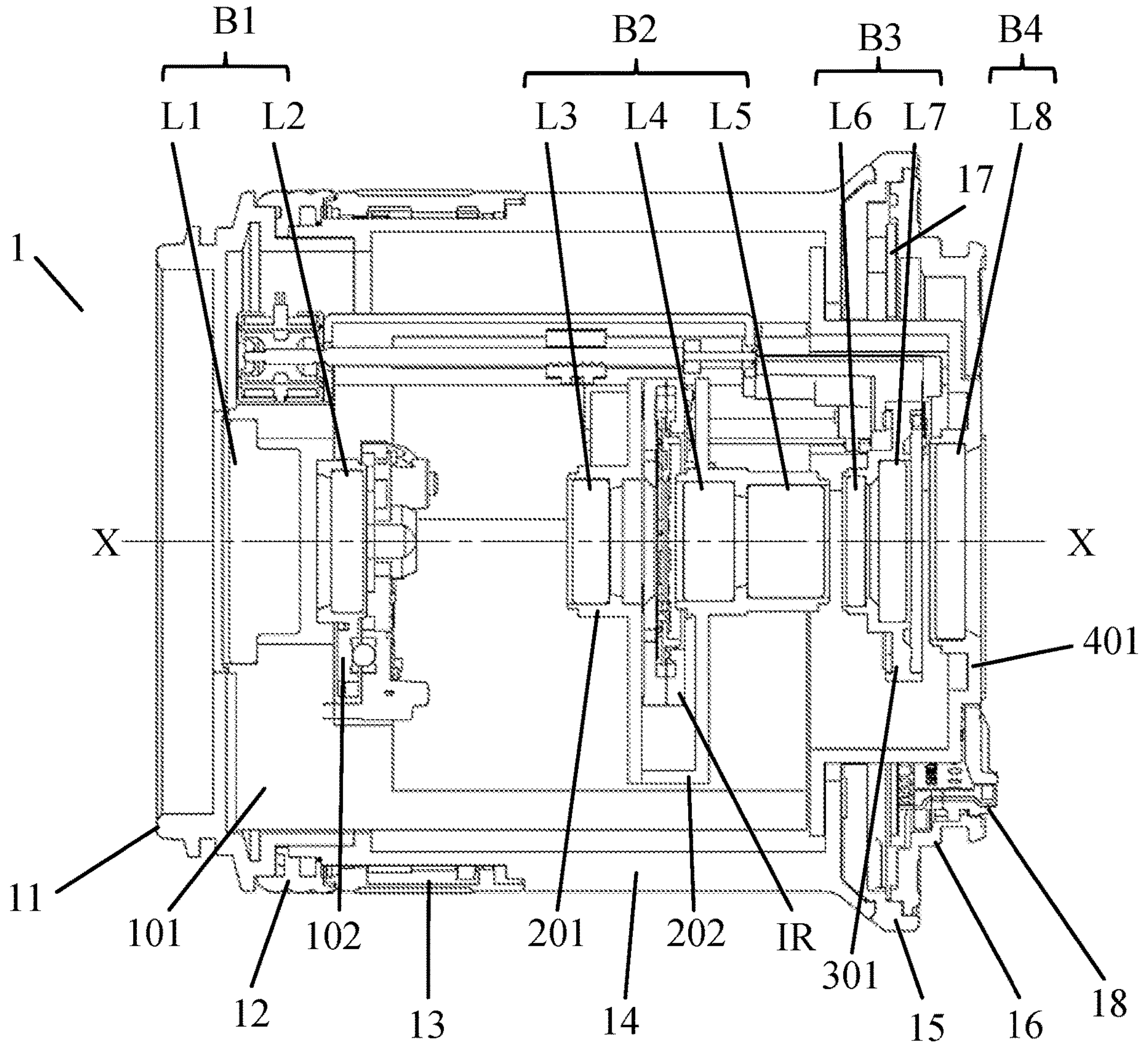
FIG. 2 is a sectional view illustrating an interchangeable lens at a wide-angle end in an in-focus state at infinity.
Figure 3:
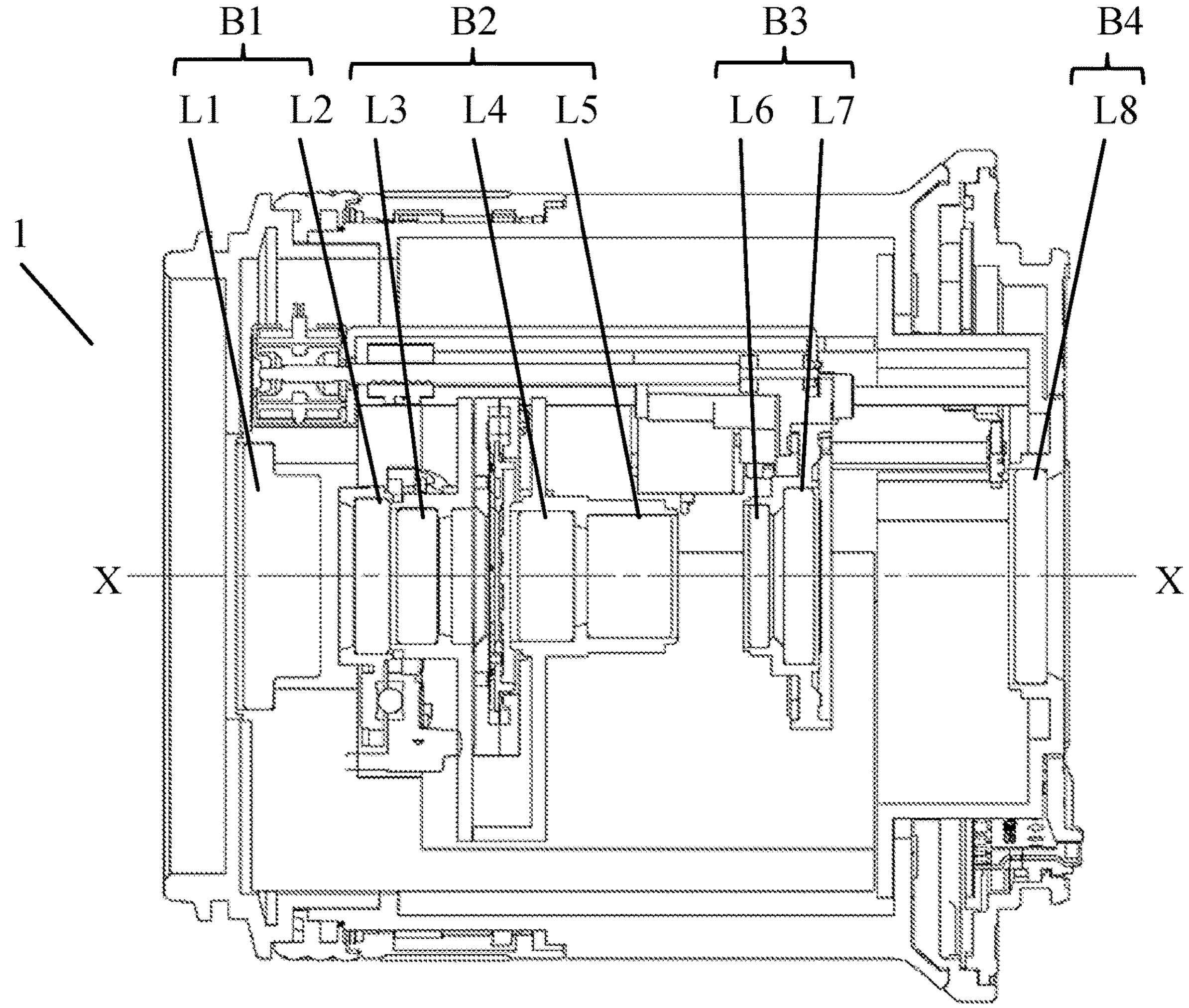
FIG. 3 is a sectional view of the interchangeable lens at a telephoto end in the in-focus state at infinity.

FIG. 2 is a sectional view illustrating the interchangeable lens 1 at a wide-angle end in an in-focus state at infinity. FIG. 3 is a sectional view of the interchangeable lens 1 at a telephoto end in the in-focus state at infinity. A line indicated by X-X in FIGS. 2 and 3 indicates an optical axis of the optical system OIS. FIG. 4 illustrates a moving locus of each lens unit for zooming. A horizontal axis in FIG. 4 indicates a distance of each lens unit from the image plane, and a vertical axis indicates the WIDE (wide-angle) side on the upper side and the TELE (telephoto) side on the lower side.

The interchangeable lens 1 includes an optical system OIS having a plurality of lens units that consists of, in order from the object side to the image side, a first lens unit B1 having negative refractive power, a second lens unit B2, a third lens unit B3, and a fourth lens unit B4. The first lens unit B1 includes a first lens L1 and a second lens (first optical member) L2. The second lens unit B2 includes a third lens L3, a fourth lens L4, and a fifth lens L5. The third lens unit B3 includes a sixth lens L6 and a seventh lens L7. The fourth lens unit B4 includes an eighth lens L8.

The first lens unit B1 and the fourth lens unit B4 are fixed units that do not move (fixed relative to the image plane) for zooming and focusing. The second lens unit B2 is a moving unit that moves for zooming. The third lens unit B3 is a moving unit that moves for zooming and focusing.

The first lens L1 is held in a 1A barrel 101. The second lens L2 is held in a 1B barrel 102. The 1A barrel and the 1B barrel constitute a first barrel (first holding member) that holds the first lens unit B1. The second lens L2 is an image stabilizing optical element that provides image stabilization by moving in a direction having a component orthogonal to the optical axis. The third lens L3 is held in a 2A barrel 201. The fourth lens L4 and the fifth lens L5 are held in a 2B barrel 202. The 2A barrel and the 2B barrel constitute a second barrel (second holding member) that holds the second lens unit B2. An electromagnetic aperture unit (light amount adjusting unit) IR is held between the 2A barrel 201 and the 2B barrel 202. The sixth lens L6 and the seventh lens L7 are held in a third barrel 301. The eighth lens L8 is held by a fourth barrel (first holding member) 401.

A mount 16 is a component fixed to the camera body CB. The interchangeable lens 1 is bayonet-fixed to the camera body CB via the mount 16. An exterior ring 15 is integrally fixed to the mount 16 together with a fixed barrel 14. A control board 17 includes an IC, a microcomputer, etc. for driving the interchangeable lens 1, and is held between the mount 16 and the exterior ring 15. The fixed barrel 14 fixes an unillustrated angular velocity sensor that is electrically connected to the control board 17. The control board 17 controls the second lens L2 using the angular velocity detected by the angular velocity sensor.

The control board 17 is electrically connected to a contact block 18 and receives communication with the camera body CB and power supply. After the interchangeable lens 1 is fixed to the camera body CB, the control board 17 can communicate with the camera body CB via the contact block 18.

A zoom ring 13 is rotatably held on the outer circumference of the fixed barrel 14. As the zoom ring 13 is rotated, the second lens unit B2 and the third lens unit B3 move. An unillustrated zoom detecting sensor detects a rotational amount of the zoom ring 13 and is attached to the fixed barrel 14. The control board 17 controls zooming using the rotational amount detected by the zoom detecting sensor. A focus ring 12 is rotatably held on the outer circumference of the fixed barrel 14 and is sandwiched between the fixed barrel 14 and a filter frame 11. As the focus ring 12 is rotated, the third lens unit B3 moves. An unillustrated focus detecting sensor detects a rotational amount of the focus ring 12 and is attached to the fixed barrel 14. The control board 17 controls focusing using the rotational amount detected by the focus detecting sensor.

The fourth barrel 401 is fixed to the 1A barrel 101. The 1A barrel 101 is fixed to the fixed barrel 14.

FIGS. 5A and 5B are exploded perspective views of the image stabilizing apparatus. FIGS. 5A and 5B are exploded perspective views of the image stabilizing apparatus viewed from the object side and the image side, respectively.

The 1B barrel 102 is supported by a base plate 107 via rolling balls 106 so as to be movable in a direction orthogonal to the optical axis. The 1B barrel 102 is constantly pulled against the base plate 107 by tension coil springs 103 via the rolling balls 106. Yokes 104 and driving magnets 105 are fixed to the 1B barrel 102. Coils 108 are fixed to the base plate 107. The driving magnets 105 are disposed to face the coils 108. The coils 108 are electrically connected to the control board 17 by an unillustrated flexible board (flexible printed circuit: FPC). As the current flows through the coils 108, the Lorentz forces are generated in the driving magnets 105. The generated Lorentz forces causes the 1B barrel 102 to move in the direction orthogonal to the optical axis. The coils 108 and the driving magnets 105 are each arranged in two orthogonal directions. Therefore, the 1B barrel 102 can freely move within a predetermined range on a plane orthogonal to the optical axis by combining driving forces (Lorentz forces) in two directions.

Here, an electromagnetic actuator unit (first driving unit) EA1 includes the yokes 104, the driving magnets 105, and the coils 108. The driving magnets 105 face unillustrated Hall elements fixed to the base plate 107. Each Hall element is connected to the control board 17 by an unillustrated flexible printed circuit (FPC). Each Hall element converts the magnetic flux density of the driving magnet 105 into an electrical signal. As the 1B barrel 102 moves, the Hall element detects a change in the magnetic flux density of the driving magnet 105 and outputs an electric signal according to the detected change in magnetic flux density. The control board 17 can detect the position of the 1B barrel 102 in the direction orthogonal to the optical axis using the electrical signals output from the Hall elements.

The base plate 107 is fixed to the 1A barrel 101. As the 1B barrel 102 is lifted up in a direction away from the base plate 107 due to an impact or the like, the 1A barrel 101 restricts the lifting up.

Figure 6A:
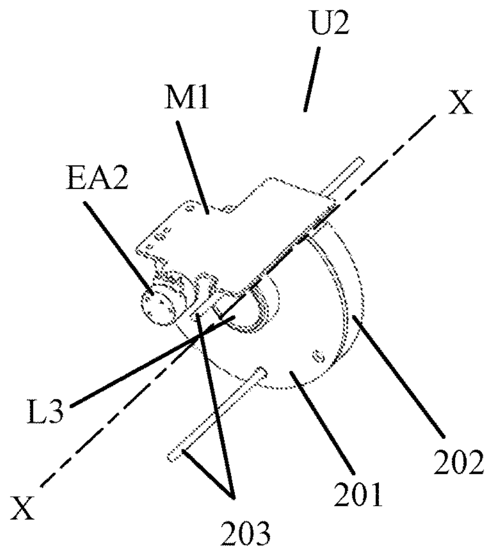
FIGS. 6A and 6B are perspective views illustrating the configuration of the zoom unit.
Figure 6B:
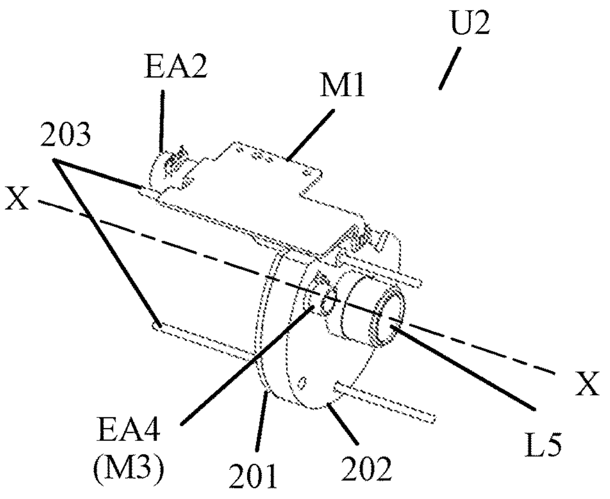

FIGS. 6A and 6B are perspective views illustrating the configuration of the second unit U2 (zoom unit) that moves for zooming. FIGS. 6A and 6B are perspective views of the second unit U2 viewed from the object side and the image plane side, respectively.

The 2A barrel 201 holds the third lens L3 and is fixed to the 2B barrel 202 that holds the fourth lens L4 and the fifth lens L5. The second unit U2 includes the third lens L3, the fourth lens L4, the fifth lens L5, the 2A barrel 201, the 2B barrel 202, the electromagnetic aperture unit IR, an unillustrated rack, and an unillustrated rack spring. The second unit U2 is supported by a guide bar 203 so as to be movable along the optical axis. The guide bar 203 is held between the 1A barrel 101 and the fourth barrel 401. The zoom driving motor M1 is fixed to the 1A barrel 101. The zoom driving motor M1 includes a leadscrew portion as a rotational output shaft, and an electromagnetic actuator unit EA2. The rack is screwed with the leadscrew portion of the zoom driving motor M1 by the biasing force of the rack spring. The zoom driving motor M1 is, for example, a stepping motor, a DC motor, or a VCM. Therefore, electromagnetic force is generated in the electromagnetic actuator unit EA2 by the coil and the magnet. The zoom driving motor M1 is electrically connected to the control board 17 via an unillustrated FPC. As the current is applied to the zoom driving motor M1 during zooming, the leadscrew portion rotates and the second unit U2 moves along the optical axis.

Figure 7A:
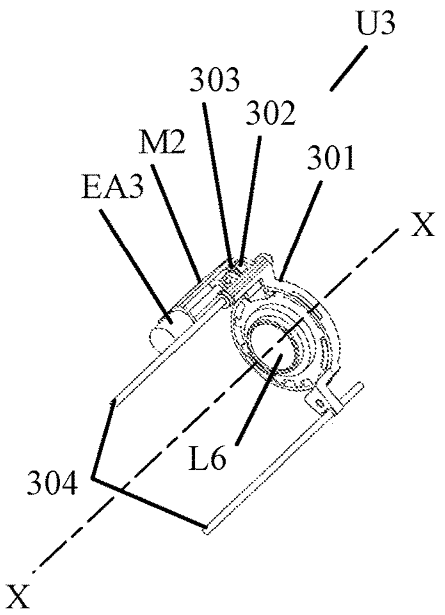
FIGS. 7A and 7B are perspective views illustrating the configuration of the focus unit.
Figure 7B:
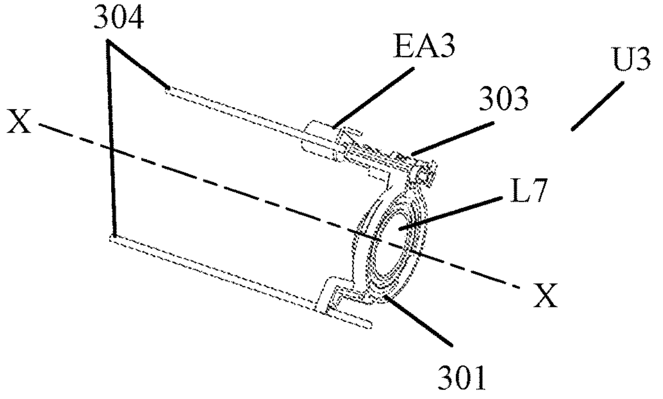

FIGS. 7A and 7B are perspective views illustrating the configuration of a third unit U3 (focus unit) that moves for focusing. FIGS. 7A and 7B are perspective views of the third unit U3 viewed from the object side and the image plane side, respectively.

The third unit U3 includes the sixth lens L6, the seventh lens L7, the third barrel 301, a rack 302, and a rack spring 303. The rack 302 and the rack spring 303 are held in the third barrel 301. The third unit U3 is supported movably along the optical axis by guide bars 304. The guide bars 304 are held between the 1A barrel 101 and the fourth barrel 401. The focus driving motor M2 is fixed to the 1A barrel 101. The focus driving motor M2 includes a leadscrew portion as a rotational output shaft, and an electromagnetic actuator unit EA3. The rack 302 is screwed with the leadscrew portion of the focus driving motor M2 by the biasing force of the rack spring 303. The focus driving motor M2 is, for example, a stepping motor, a DC motor, or a VCM. Therefore, the electromagnetic force due to the coil or magnet is generated in the electromagnetic actuator unit EA3. The focus driving motor M2 is electrically connected to the control board 17 via an unillustrated FPC. As the current is applied to the focus driving motor M2 during zooming and focusing, the leadscrew portion rotates and the third unit U3 moves along the optical axis.

Figure 8A:
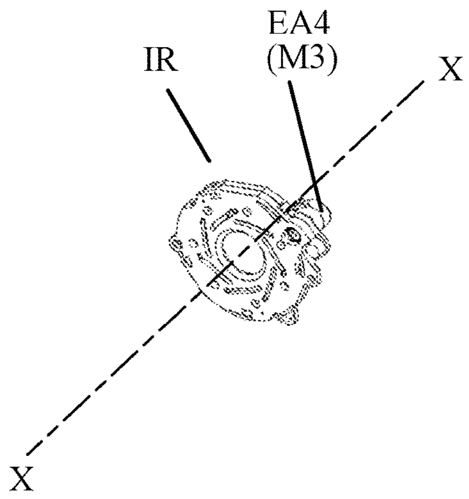
FIGS. 8A and 8B are perspective views illustrating the configuration of a light amount adjusting unit.
Figure 8B:
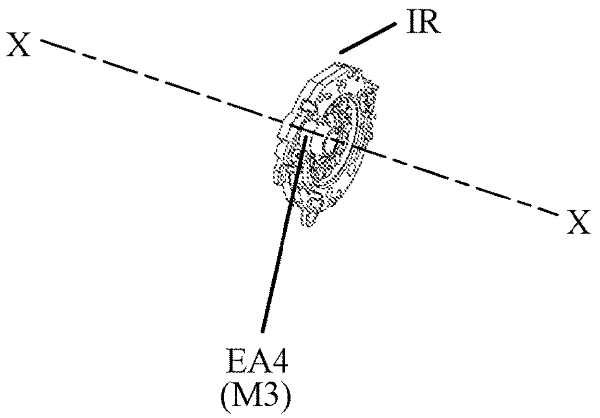

FIGS. 8A and 8B are perspective views illustrating the configuration of the electromagnetic aperture unit IR as a light amount adjusting unit. FIGS. 8A and 8B are perspective views of the electromagnetic aperture unit IR viewed from the object side and the image plane side, respectively.

The electromagnetic aperture unit IR includes a plurality of aperture blades forming an unillustrated aperture, and can adjust the aperture area of the aperture by displacing the plurality of aperture blades in a direction crossing the optical axis. Thereby, the light amount incident on the optical system can be adjusted. The aperture blades are displaced by rotation of an unillustrated rotating plate. Rotation of the rotating plate is transmitted via a gear portion attached to an unillustrated output shaft of the aperture driving motor M3. The aperture driving motor M3 includes an output shaft and an electromagnetic actuator unit EA4. The aperture driving motor M3 is, for example, a stepping motor, a DC motor, or a VCM. Therefore, in the electromagnetic actuator unit EA4, electromagnetic force is generated by the coil or magnet. The aperture driving motor M3 is electrically connected to the control board 17 via an unillustrated FPC. As the current is applied to the aperture driving motor M3 in adjusting the light amount, the aperture area of the aperture is adjusted.

As described above, the electromagnetic force is generated in the electromagnetic actuator units EA1, EA2, EA3, and EA4 when they are driven. If the magnetic field generated during driving reaches the image sensor IE, fluctuations in magnetic flux density affect the image signal, causing image quality deterioration of a captured image. More specifically, a magnetic field that changes at a high frequency passes through a signal line of pixel charge information for extracting the image signal from the image sensor IE. Thereby, magnetism is generated in the signal line due to electromagnetic induction and consequently, noise is generated in the signal line for the pixel charge information. Furthermore, if the electromagnetic actuator units are close to each other, the magnetic fields interfere (influence) each other during driving, causing malfunction. The intensity of the magnetic field generated from each electromagnetic actuator unit is inversely proportional to the cube of the distance. Therefore, in order to suppress the image quality deterioration of a captured image, each electromagnetic actuator unit may be disposed apart from the image sensor IE. In order to suppress interference of magnetic fields among the electromagnetic actuator units, the distance between the electromagnetic actuator units may be increased.

Figure 9A:
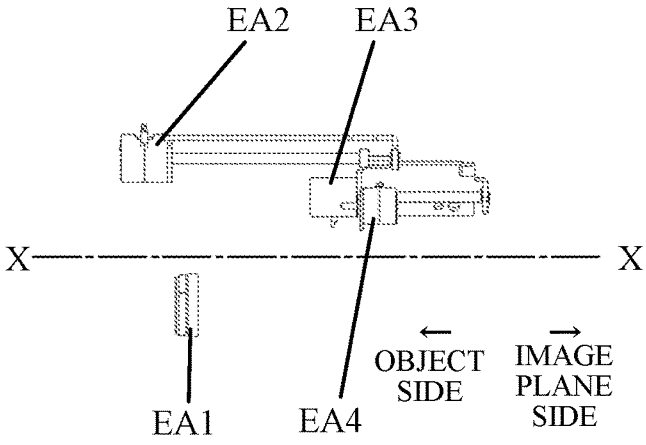
FIGS. 9A and 9B illustrate an example of a positional relationship of electromagnetic actuator units at the wide-angle end.
Figure 9B:
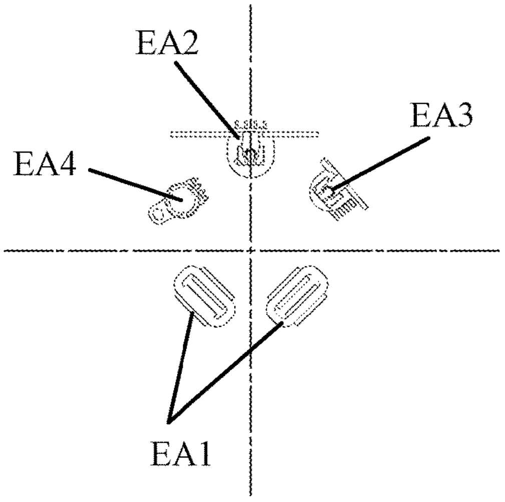

FIGS. 9A and 9B illustrate an example of a positional relationship of the electromagnetic actuator units at the wide-angle end. FIG. 9A illustrates the positional relationship of the electromagnetic actuator units when viewed from a direction orthogonal to the optical axis. FIG. 9B illustrates the positional relationship of the electromagnetic actuator units when viewed from a direction parallel to the optical axis on the image plane side.

Figure 10A:
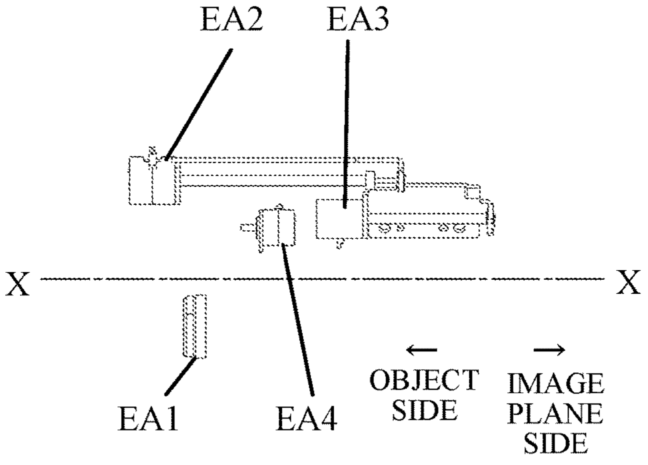
FIGS. 10A and 10B illustrate an example of a positional relationship of the electromagnetic actuator units at the telephoto end.
Figure 10B:
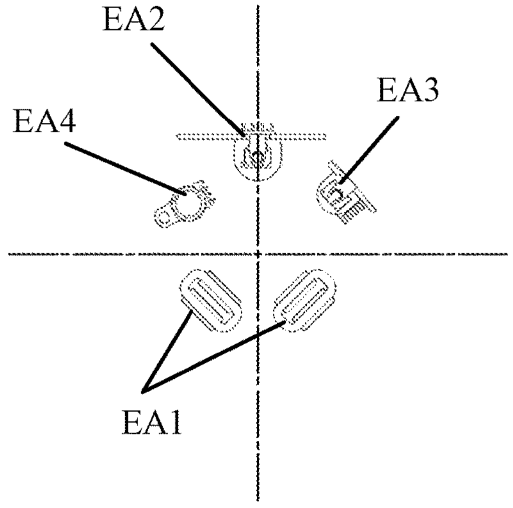

FIGS. 10A and 10B illustrate an example of a positional relationship of the electromagnetic actuator units at the telephoto end. FIG. 10A illustrates the positional relationship of the electromagnetic actuator units when viewed from a direction orthogonal to the optical axis. FIG. 10B illustrates the positional relationship of the electromagnetic actuator units when viewed from a direction parallel to the optical axis on the image plane side.

In this embodiment, the second lens L2 as an image stabilizing optical element is disposed in the first lens unit B1, which is disposed closest to the object of the optical system OIS. Thereby, the electromagnetic actuator unit EA1 can be placed apart from the image sensor IE, so that the image quality deterioration of the captured image can be suppressed.

In this embodiment, the electromagnetic actuator unit EA2 is disposed so that at least its part overlaps the first lens unit B1 when viewed from a direction orthogonal to the optical axis. Thereby, the electromagnetic actuator unit EA2 can be placed apart from the image sensor IE, so that the image quality deterioration of the captured image can be suppressed.

In this embodiment, the electromagnetic actuator unit EA2 is disposed so as not to overlap the electromagnetic actuator unit EA1 when viewed from a direction parallel to the optical axis. Thereby, interference of the magnetic field between the electromagnetic actuator units EA1 and EA2 can be suppressed, and malfunction of the electromagnetic actuator units EA1 and EA2 can be suppressed. If the electromagnetic actuator unit EA2 is disposed so as to overlap the electromagnetic actuator unit EA1 when viewed from the direction parallel to the optical axis, the overall length of the interchangeable lens 1 may be longer. In this embodiment, the electromagnetic actuator unit (second driving unit) EA2 configured to move the second lens unit B2 as the second optical member is disposed so as not to overlap the electromagnetic actuator unit EA1 as the first driving unit when viewed from the direction parallel to the optical axis. The second optical member and the second driving unit of this embodiment are not limited. For example, the electromagnetic actuator unit EA3 configured to move the third lens unit B3 may be disposed so as not to overlap the electromagnetic actuator unit EA1 when viewed from the direction parallel to the optical axis. In this case, the third lens unit B3 functions as a second optical member, and the electromagnetic actuator unit EA3 functions as a second driving unit. The electromagnetic actuator unit EA4 configured to move the electromagnetic aperture unit IR may be disposed so as not to overlap the electromagnetic actuator unit EA1 when viewed from the direction parallel to the optical axis. In this case, the electromagnetic aperture unit IR functions as a second optical member, and the electromagnetic actuator unit EA4 functions as a second driving unit.

A description will be given of a configuration that may be satisfied in the interchangeable lens 1.

In this embodiment, the first lens unit B1 may have negative refractive power. The lens outer diameter of the first lens unit B1 is smaller than that in the case of having positive refractive power. Therefore, an increase in the outer diameter of the interchangeable lens 1 can be suppressed even if the electromagnetic actuator unit EA2 is disposed so that at least its part overlaps the first lens unit B1 when viewed from the direction orthogonal to the optical axis.

In this embodiment, the electromagnetic actuator unit EA3 may be disposed so as to overlap part of the moving range of the second lens unit B2 when viewed from the direction orthogonal to the optical axis. More specifically, as illustrated by area O in FIG. 4, the moving ranges of the second lens unit B2 and the third lens unit B3 may overlap each other. This configuration can increase the zoom magnification, shorten the shortest imaging distance, or reduce the overall length of the interchangeable lens 1.

In this embodiment, the electromagnetic actuator unit EA3 may be disposed on the object side of the moving range of the third lens unit B3. Thereby, the electromagnetic actuator unit EA3 can be disposed apart from the image sensor IE, so that the image quality deterioration of the captured image can be suppressed.

In this embodiment, the electromagnetic actuator unit EA3 may be disposed so as not to overlap the electromagnetic actuator unit EA1 when viewed from the direction parallel to the optical axis. This configuration can suppress interference of the magnetic field between the electromagnetic actuator units EA1 and EA3 and malfunction of the electromagnetic actuator units EA1 and EA3.

In this embodiment, the electromagnetic actuator unit EA4 may be disposed so as not to overlap the electromagnetic actuator unit EA1 when viewed from the direction parallel to the optical axis. This configuration can suppress interference of the magnetic field between the electromagnetic actuator units EA1 and EA4 and malfunction of the electromagnetic actuator units EA1 and EA4.

In this embodiment, the electromagnetic actuator units EA2 and EA3 may be fixed to the first barrel, and the electromagnetic aperture unit IR may be fixed to the second barrel. This configuration can reduce the number of parts. The electromagnetic actuator units EA2 and EA3 may be fixed to the fourth barrel 401. The electromagnetic actuator unit EA2 may be fixed to the 1A barrel 101, and the electromagnetic actuator unit EA3 may be fixed to the fourth barrel 401.

In this embodiment, the electromagnetic actuator unit EA3 may be disposed so as to overlap the electromagnetic aperture unit IR when viewed from the direction orthogonal to the optical axis, but it may be arranged on the object side of the electromagnetic aperture unit IR. This arrangement can avoid increasing the outer diameter of the interchangeable lens 1 in order to avoid physical interference between the electromagnetic actuator unit EA3 and the electromagnetic aperture unit IR.

Figure 11A:
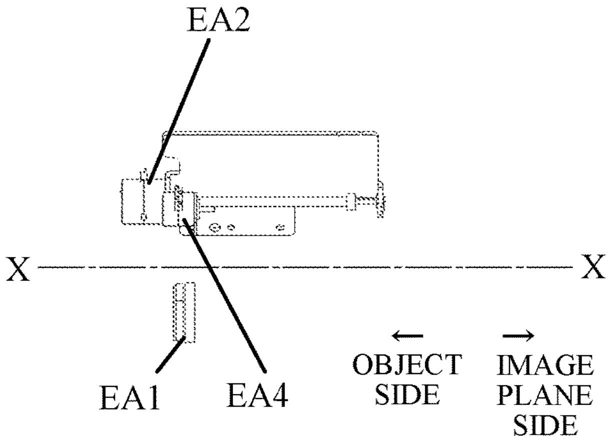
FIGS. 11A and 11B illustrate another example of the positional relationship of the electromagnetic actuator units.
Figure 11B:
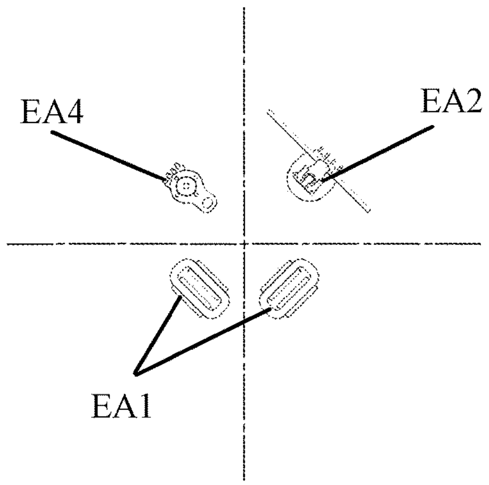

In this embodiment, only the electromagnetic actuator unit EA2 overlaps the first lens unit B1 when viewed from the direction orthogonal to the optical axis. At this time, as illustrated in FIG. 10B, the electromagnetic actuator unit EA2 may be disposed farthest from the electromagnetic actuator unit EA1 when viewed from the direction parallel to the optical axis. However, this embodiment is not limited to this example. FIGS. 11A and 11B illustrate another example of a positional relationship of the electromagnetic actuator units. FIG. 11A illustrates the positional relationship of the electromagnetic actuator units when viewed from the direction orthogonal to the optical axis. FIG. 11B illustrates the positional relationship of the electromagnetic actuator units when viewed from the direction parallel to the optical axis on the image plane side. As illustrated in FIG. 11A, the electromagnetic actuator units EA2 and EA4 may overlap the first lens unit B1 when viewed from the direction orthogonal to the optical axis. At this time, as illustrated in FIG. 11B, the electromagnetic actuator units EA2 and EA4 may be disposed at equal distances from the electromagnetic actuator unit EA1 when viewed from the direction parallel to the optical axis. Herein, "equal" covers not only strictly equal but also substantially equal (approximately equal).

Figure 12:
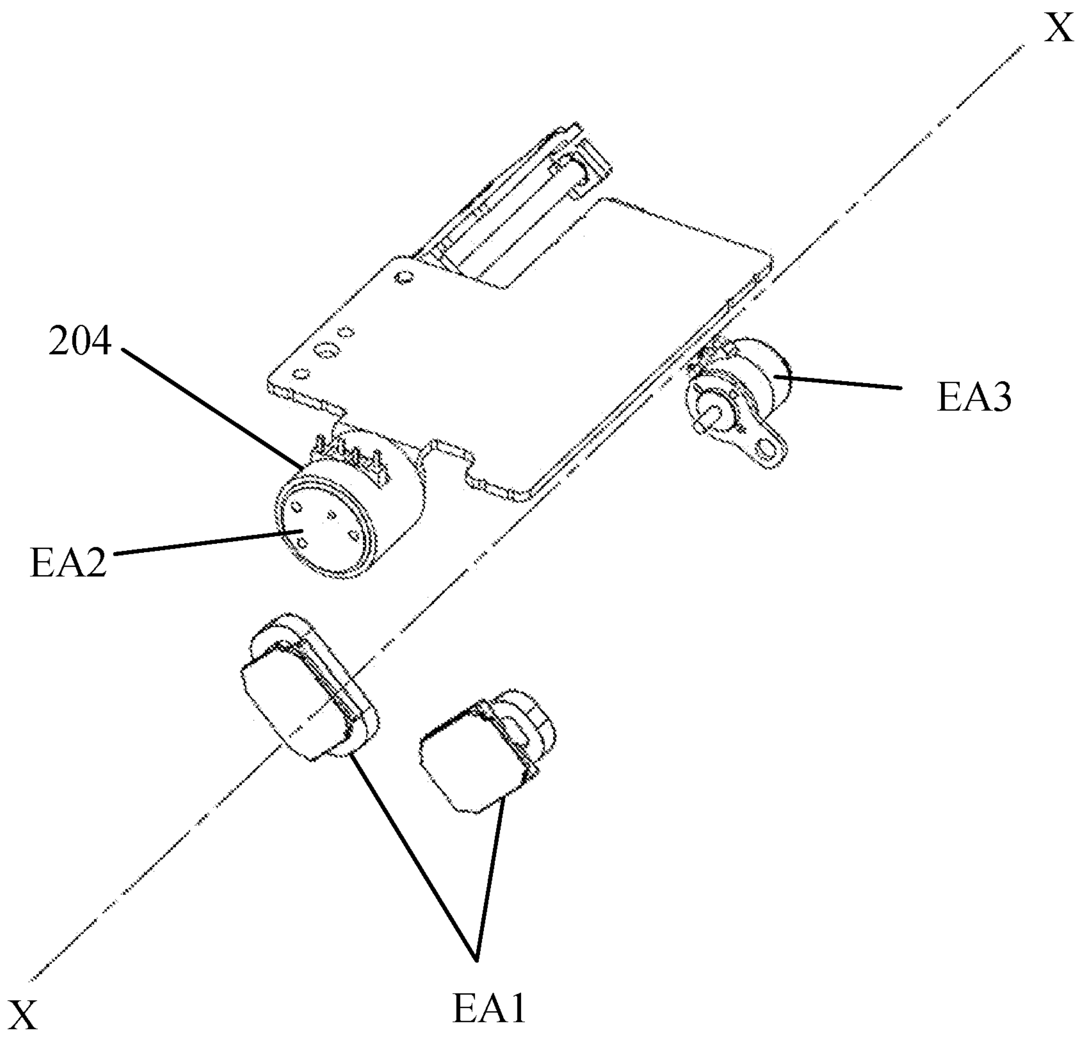
FIG. 12 illustrates another example of the electromagnetic actuator unit.

As illustrated in FIG. 12, a magnetic shielding member 204 may be wrapped around the electromagnetic actuator unit EA2. Thereby, interference of magnetic fields between the electromagnetic actuator unit EA2 and other electromagnetic actuator units can be further suppressed. The magnetic shielding member 204 may be made of a copper or aluminum sheet metal that is nonmagnetic and has low electrical resistance or may be made of a material with high magnetic permeability such as permalloy.

As described above, the configuration according to this embodiment can realize an interchangeable lens 1 that is compact and can suppress image quality deterioration and electromagnetic interference while electromagnetic actuator units are driven.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This embodiment can provide a compact lens apparatus that can suppress image quality deterioration and electromagnetic interference when electromagnetic actuators are driven.

This application claims the benefit of Japanese Patent Application No. 2023-007905, filed on Jan. 23, 2023, which is hereby incorporated by reference herein in its entirety.

What is claimed is:

1. A lens apparatus comprising:

an optical system including:

a first lens unit disposed closest to an object and including a first optical member movable in a direction including a component orthogonal to an optical axis during image stabilization; and a second optical member disposed on an image side of the first optical member;

a first driving unit configured to move the first optical member; and a second driving unit configured to move the second optical member, wherein the first driving unit and the second driving unit are disposed so as to not overlap each other as viewed along the optical axis of the optical system, and wherein a position of at least part of the second driving unit, in a direction along the optical axis, overlaps a position of the first lens unit, in the direction along the optical axis.

2. The lens apparatus according to claim 1, wherein;

the optical system includes a plurality of lens units that consists of, in order from an object side to an image side, the first lens unit, a second lens unit, a third lens unit, and a fourth lens unit, the first lens unit and the fourth lens unit are fixed relative to an image plane for zooming and focusing, the second lens unit moves for zooming, and the third lens unit moves for focusing.

3. The lens apparatus according to claim 2, wherein the second optical member is the second lens unit.

4. The lens apparatus according to claim 3, further comprising a third driving unit configured to move the third lens unit, wherein the third driving unit is disposed on the object side of a moving range of the third lens unit.

5. The lens apparatus according to claim 4, wherein the third driving unit is disposed so as to overlap a part of a moving range of the second lens unit when as viewed from a direction orthogonal to the optical axis.

6. The lens apparatus according to claim 4, further comprising a light amount adjusting unit configured to adjust a light amount from the object, wherein the third driving unit is disposed on the object side of the light amount adjusting unit.

7. The lens apparatus according to claim 4, the third driving unit is disposed so as to not overlap the first driving unit as viewed from a direction orthogonal to the optical axis.

8. The lens apparatus according to claim 4, further comprising:
- a light amount adjusting unit configured to adjust a light amount from the object;
- a fourth driving unit configured to move the light amount adjusting unit;
- a first holding member configured to hold the fourth lens unit; and
- a second holding member configured to hold the second lens unit,
- wherein the second driving unit and the third driving unit are fixed to the first lens unit or to the first holding member, and
- wherein the fourth driving unit is fixed to the second holding member.

9. The lens apparatus according to claim 3, further comprising:
- a light amount adjusting unit configured to adjust a light amount from the object; and
- a fourth driving unit configured to move the light amount adjusting unit,
- wherein the fourth driving unit is disposed so as to not overlap the first driving unit as viewed from a direction orthogonal to the optical axis.

10. The lens apparatus according to claim 2, wherein the second optical member is the third lens unit.

11. The lens apparatus according to claim 1, wherein at least part of the first driving unit is disposed so that a position in the direction along the optical axis overlaps the first lens unit and the second driving unit.

12. The lens apparatus according to claim 1, further comprising:
- a light amount adjusting unit configured to adjust a light amount from the object,
- wherein the second optical member is the light amount adjusting unit.

13. The lens apparatus according to claim 2, wherein the third lens unit moves for zooming.

14. The lens apparatus according to claim 1, wherein the first lens unit has negative refractive power.

15. An image pickup apparatus comprising:
- an image sensor; and
- a lens apparatus comprising:
  - an optical system including:
    - a first lens unit disposed closest to an object and including a first optical member movable in a direction including a component orthogonal to an optical axis during image stabilization; and
    - a second optical member disposed on an image side of the first optical member;
  - a first driving unit configured to move the first optical member; and
  - a second driving unit configured to move the second optical member,
  - wherein the first driving unit and the second driving unit are disposed so as to not overlap each other as viewed along the optical axis of the optical system, and
  - wherein a position of at least part of the second driving unit, in a direction along the optical axis, overlaps a position of the first lens unit, in the direction along the optical axis.

* * * * *